US007938557B2

(12) United States Patent
Yoganandan et al.

(10) Patent No.: US 7,938,557 B2
(45) Date of Patent: May 10, 2011

(54) COLOR MANAGEMENT SYSTEM

(75) Inventors: Sundar Natarajan Yoganandan, Helang (MY); Thye Linn Mok, Rambai (MY); Kian Shin Lee, Selamat (MY); Norfidathul Aizar Abdul Karim, Ampat (MY); Su Lin Oon, Nibong (MY); Siew It Pang, Lepas (MY); Kheng Leng Tan, Jambul (MY); Fakhrul Arifin Mohd Afif, Seksyen (MY); Wen Ya Ou, Tokong (MY); Yew Cheong Kuan, Dua (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 1026 days.

(21) Appl. No.: 11/020,998

(22) Filed: Dec. 23, 2004
(Under 37 CFR 1.47)

(65) Prior Publication Data

US 2006/0139914 A1 Jun. 29, 2006

(51) Int. Cl.
*B60Q 1/26* (2006.01)

(52) U.S. Cl. ........................................ 362/227; 362/800

(58) Field of Classification Search .................. 362/227, 362/800, 800 MT; 324/96, 97, 752, 753; 364/96, 97, 752, 753
See application file for complete search history.

(56) References Cited

U.S. PATENT DOCUMENTS

| | | | | |
|---|---|---|---|---|
| 4,799,071 | A * | 1/1989 | Zeise et al. | 347/233 |
| 6,266,364 | B1 * | 7/2001 | Ishida | 375/142 |
| 7,008,121 | B2 * | 3/2006 | Pliska et al. | 385/90 |
| 2005/0030192 | A1 * | 2/2005 | Weaver et al. | 340/815.45 |

* cited by examiner

*Primary Examiner* — Jong-Suk (James) Lee
*Assistant Examiner* — Mark Tsidulko

(57) ABSTRACT

A light source and a method for operating the same are disclosed. The light source includes a light emitter and a controller. The light emitter generates light in response to a control signal coupled thereto. The light emitter is characterized by an age related to the amount of light that has been cumulatively generated by the light emitter, the generated light for a given control signal changing with the age. The controller measures the age of the light emitter and generates the control signal based on the desired light intensity and the measured age of the light emitter. In one embodiment, the controller stores an age value for the light emitter, and the controller determines the control signal in response to an input signal specifying a desired light intensity from the light emitter, the controller updating the age value each time the control signal is determined.

9 Claims, 2 Drawing Sheets

COLOR MANAGEMENT SYSTEM

BACKGROUND OF THE INVENTION

Light emitting diodes (LEDs) are attractive candidates for replacing conventional light sources such as incandescent lamps and fluorescent light sources. The LEDs have higher light conversion efficiencies and longer lifetimes. Unfortunately, LEDs produce light in a relatively narrow spectral band. Hence, to produce a light source having an arbitrary color, a compound light source having multiple LEDs is typically utilized. For example, an LED-based light source that provides an emission that is perceived as matching a particular color can be constructed by combining light from red, green, and blue emitting LEDs. The ratio of the intensities of the various colors sets the color of the light as perceived by a human observer.

The intensity of the LED can be varied by varying the drive current or the duty factor. In duty factor schemes, the LED is pulsed on a time scale that is too fast to be seen by a human observer. During each cycle, the LED is on for some fraction of the cycle time. Since the observer's eye integrates the light received over a time period that is long compared to the cycle time, the observer "sees" a light source whose intensity is proportional to the duty factor, i.e., the ratio of the time the LED is turned on to the time the LED is turned off. The intensity is a linear function of the duty factor, and hence, the control system is relatively simple.

Unfortunately, the output of the individual LEDs varies with age. Hence, a light source that provides the desired color at one point in time will exhibit a color shift when the conditions change or the device ages. To avoid these shifts, some form of feedback system is typically incorporated in the light source to vary the driving conditions of the individual LEDs such that the output spectrum remains at the design value in spite of the variability in the component LEDs used in the light source.

Typically, a prior art light source having a feedback system for maintaining the color perceived by a human observer at a predetermined hue is constructed from a plurality of LEDs that emit light at different wavelengths. Each LED is viewed by a photodetector that includes an appropriate filter that is used to measure the light that is generated by that LED. The output of the photodetector is compared to a target value to generate an error signal that is used to adjust the light output of the corresponding LED either by changing the drive current or the duty factor.

Unfortunately, such feedback systems substantially increase the cost and complexity of the light source. The cost of the photodiodes used to monitor the LEDs is similar to that of the LEDs themselves. Furthermore, the photodiodes must be positioned such that each photodiode views only one LED. If each LED in the light source emits a distinct color, color filters can be utilized to isolate the various photodiodes. However, these filters add to the cost of the light source. In addition, many LED-based light sources of interest utilize a number of LEDs of each color to provide increased light output. In such systems, additional light isolation systems must be utilized that further increase the cost and complexity of the systems.

SUMMARY OF THE INVENTION

The present invention includes a light source and a method for operating the same. The light source includes a light emitter and a controller. The light emitter generates light in response to a control signal coupled thereto. The light emitter is characterized by an age related to the amount of light that has been cumulatively generated by the light emitter, the generated light for a given control signal changing with the age. The controller measures the age of the light emitter and generates the control signal based on the desired light intensity and the measured age of the light emitter. In one embodiment the light generator is an LED. In one embodiment, the controller stores an age value for the light emitter, and the controller determines the control signal in response to an input signal specifying a desired light intensity from the light emitter, the controller updating the age value each time the control signal is determined. Embodiments having a plurality of such light emitters can also be constructed. In such embodiments, the controller measures the age of each of the light emitters and generates the control signals based on a desired light intensity for each light emitter and the measured age of that light emitter. In one embodiment, the controller stores a plurality of calibration constants, each calibration constant providing information on the rate at which a corresponding one of the light emitters ages and an age for each light emitter. The controller updates the age by utilizing a corresponding one of the calibration constants each time the desired light intensity changes. In one embodiment, the light source includes a photodetector for measuring a light intensity that is generated by each of the light emitters under predetermined input signal conditions. The controller utilizes the measured light intensity to update the calibration constants if necessary.

DETAILED DESCRIPTION OF THE PREFERRED EMBODIMENTS OF THE INVENTION

The present invention is based on the observation that the decrease in light output over time can be approximated by a linear function of the operating parameters of the LED, and hence, can be predicted if the relevant calibration constants are known for the LEDs in question. As the device ages, the drive current can then be increased to a value that depends on the age of the device, and hence, at least a partial correction for the aging effects can be obtained without the high cost and complexity associated with feedback systems.

Figure 1:
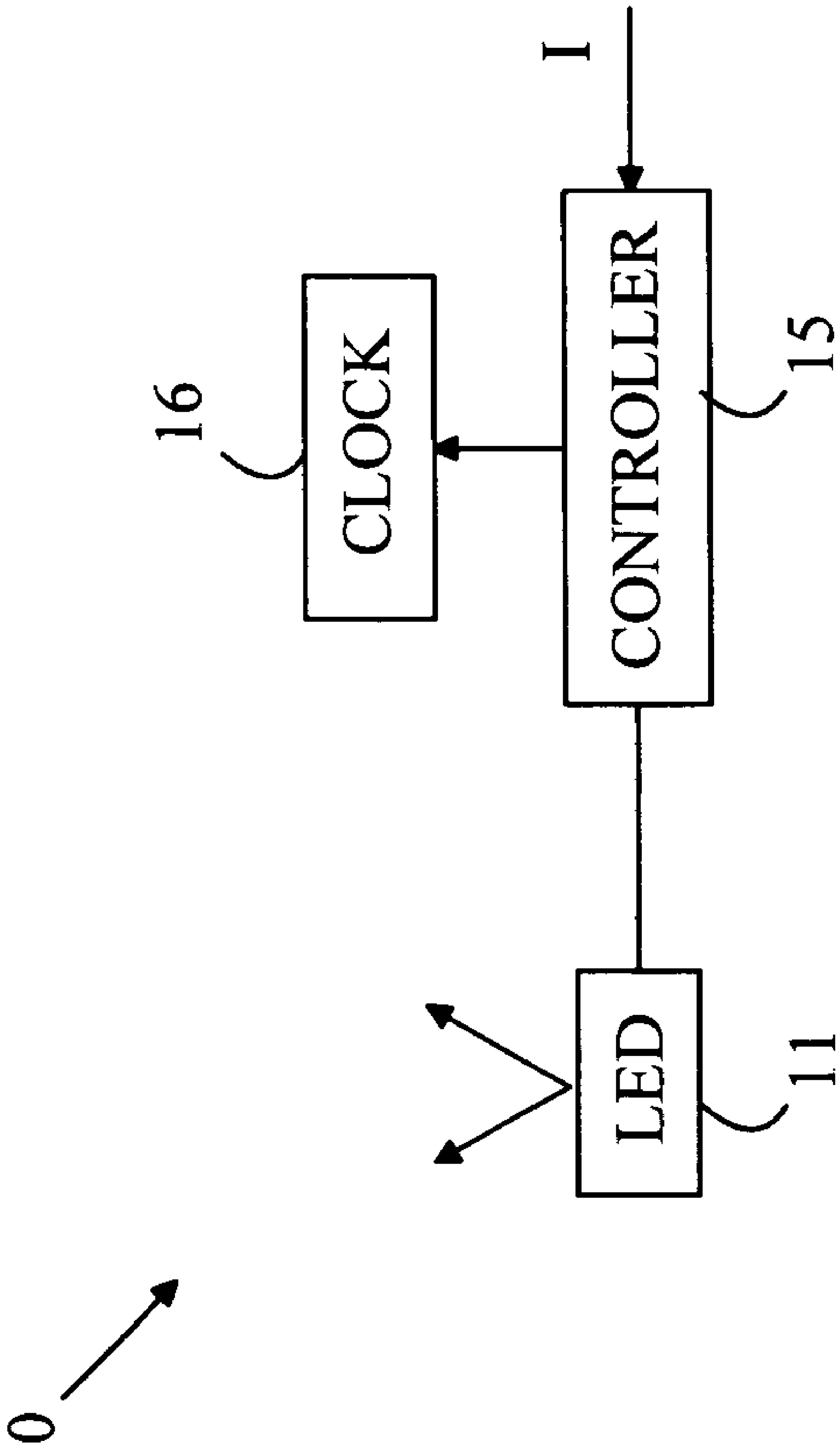
FIG. 1 illustrates a light source 10 according to one embodiment of the present invention.

Refer now to FIG. 1, which illustrates a light source 10 according to one embodiment of the present invention. Light source 10 includes an LED 11 and a controller 15 that sets the drive current through LED 11. Controller 15 receives an input signal specifying the desired light output from LED 11. For the purposes of this discussion, it will be assumed that the intensity of light from LED 11 is controlled by controlling the duty factor of an on-off signal sent to LED 11 by controller 15. In the absence of aging effects, controller 11 would utilize a fixed mapping to convert the intensity signal into the duty factor to be applied to the LED drive current. The present invention utilizes a mapping that takes into account the "age" of the LED. That is, the duty factor is computed according to $$DF=\text{age}*f_a+I*f_d$$

Here $f_a$ and $f_d$ are calibration constants that depend on the LED and I is the desired intensity that was communicated to controller 15. Controller 15 updates the age of the LED when the intensity changes. Controller 15 includes a clock 16 that generates a timing signal that is stored in a counter in controller 15. The counter value measures the time since the last change in the intensity. To a first approximation, the increase in age of the LED since the last intensity change is proportional to the power that was dissipated in the LED since the last change in intensity. The power is, in turn, proportional to the current that flows through the LED times the duty factor. Since it is assumed that the current remains constant, the change in age is proportional to the duty factor to this approximation. That is, $$\text{age}(t_2)=\text{age}(t_1)+(t_2-t_1)D$$

Where $t_1$ is the last time at which the intensity was changed, $t_2$ is the current time, and D is the duty factor times a proportionality constant. If the rate of aging is more pronounced as the duty factor increases, a more exact aging estimate can be generated by replacing D with a function, A(D) that takes into account the variation in aging as a function of duty factor.

In addition, the time interval, $(t_2-t_1)$ can be replaced by $(t_2-t_1-t_w)$ to account for "warm-up" effects in the LED. In one embodiment, the ageing factor is computed only after the output from the LED has stabilized. It can take one or two minutes of operation before the LED reaches stable operation. In this embodiment, the factor, $t_w$, is set to the warm-up time. That is, the warm-up time is not included in the calculated age of the device.

The above-described embodiments utilize the duty factor to control the intensity. However, an analogous methodology can be used to compensate for aging in an LED in which the output light intensity is controlled by controlling the drive current through the LED. In such a system, the drive current, DI, is set according to $$DI=\text{age}*f_a'+I*f_d'$$

Here, $f_a'$ and $f_d'$ are calibration constants that depend on the LED and I is the desired intensity as described above. In this case, $$\text{age}(t_2)=\text{age}(t_1)+(t_2-t_1)A'(DI)$$

where A'(DI) is the incremental aging per unit time that occurs when the LED is driven with a drive current DI, and DI is the drive current currently set through the LED. Once again, the time interval, $(t_2-t_1)$, can be replaced by $(t_2-t_1-t_w)$ to account for warm-up effects.

It should be noted that the aging effects are more predicable in LEDs that are driven with a constant drive curve, as opposed to varying the duty factor at a fixed driving current. Furthermore, light sources that utilize a number of LEDs connected in series to provide increased light output can be operated with a single aging control that changes the series current based on the age of the string of LEDs.

The embodiments discussed above depend on a set of calibration constants. The calibration constants for any particular LED can be determined by observing the light output of the LED over some period of time using different duty factors and/or drive currents. The measured light intensity values are then fit to the appropriate function to determine the relevant constants. Since mathematical algorithms for performing the fitting computations are well known in the art, these algorithms will not be discussed in detail here.

In principle, all of the LEDs in a particular production run will have the same calibration constants, and hence, sample LEDs can be calibrated at the factory prior to shipping the remaining LEDs. In such an arrangement, the calibration samples can be subjected to continuous running over a period of time that is sufficiently long to observe the aging effects at a number of different duty factors.

Figure 2:
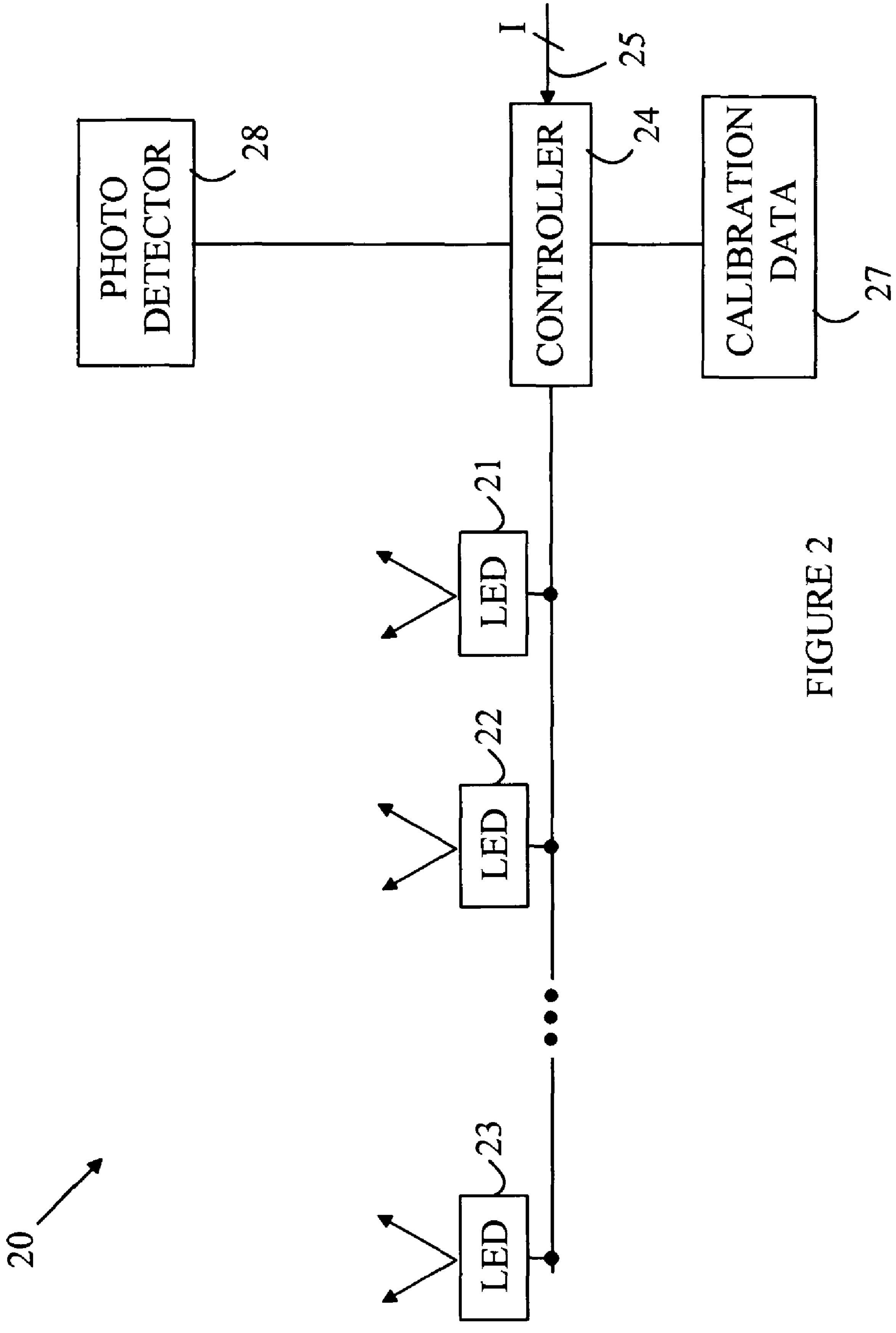
FIG. 2 illustrates a multiple LED light source according to another embodiment of the present invention.

The embodiments discussed above have a single LED. However, embodiments with a plurality of LEDs and a single controller can also be constructed. Refer now to FIG. 2, which illustrates a multiple LED light source according to another embodiment of the present invention. Light source 20 includes a plurality of LEDs as shown at 21-23. The intensity of light from these LEDs is controlled by controller 24, which receives signals that determine the intensity to be generated by each LED on an input port 25. For example, light source 20 can have LEDs of a number of different colors, and the control signals received on port 25 might specify the intensities of each component color. In addition, light source 20 can include a plurality of LEDs for each color. Controller 25 includes a memory 27 that stores the age and aging constants for each LED as well as the current driving conditions for each LED. When the control signals change, controller 24 updates the age of each LED and computes the new drive currents and/or duty factors to be applied to each LED. As noted above, if the LEDs are driven in series, the age and drive current for the string as a whole can be utilized.

The above-described embodiments of the present invention assume that the calibration constants are measured at the factory. However, embodiments that measure these constants in the field can also be constructed by including a photodetector such as photodetector 28 shown in FIG. 2. In such embodiments, controller 24 utilizes photodetector 28 to periodically measure the light being generated in each LED when a predetermined light level is to be generated. Controller 24 utilizes the current calibration constants to set the drive current and/or duty factor. If the light output differs significantly from that previously observed under these driving conditions, controller 24 adjusts the calibration constants accordingly. For example, if the light output has decreased, then controller 24 assumes that the LED has aged more rapidly than expected and adjusts the constants that set the rate of aging for this LED to reflect the higher aging rate. Controller 24 also updates the current age of the LED to reflect the more rapid aging that it had undergone since the last calibration.

It should be noted that the photodetector need not be permanently connected to controller 24. The photodetector only needs to be attached to controller 24 during the recalibration process. If the recalibration process is initiated manually, then the photodetector can be attached as part of the manual calibration process.

It should be noted that the photodetector does not need to be calibrated, since the drive conditions are set to maintain its output at some predetermined level. Furthermore, a single photodetector can be used for the entire light source, provided the photodetector output remains constant over time for a given level of light input thereto and the spectral response of the photodetector is sufficient to provide a signal at each of the LED wavelengths of interest. Controller 24 can store the target photodetector output for each LED with the calibration constants for that LED. The target values, in effect, provide a calibration that takes into account any differences in light collection efficiency with respect to the individual LEDs.

The calibration process can be carried out periodically. Since the calibration conditions differ from the normal operation conditions, the light source is preferably calibrated at a time at which the light source is not required to be functioning. The calibration procedure only needs to be carried out after the light source has aged by a significant amount, and then, only if the observed intensity and/or color appears to differ from the expected values. For example, if the color appears to have shifted to an observer, the calibration procedure could be triggered by manually inputting a signal to controller 24 that initiates the procedure. Alternatively, controller 24 could initiate the calibration procedure at some predetermined interval.

While the controller and/or calibration hardware adds some cost to the light source, the additional cost is substantially less than the costs associated with systems that monitor each LED on a continuous basis to maintain the output at the desired levels. Such systems are particularly complex in light sources that have a large number of LEDs, since each LED requires a monitoring photodetector that must be positioned such that the monitoring photodetector views only the corresponding LED.

Various modifications to the present invention will become apparent to those skilled in the art from the foregoing description and accompanying drawings. Accordingly, the present invention is to be limited solely by the scope of the following claims.

What is claimed is:

1. A light source, comprising:

a light emitter that generates light in response to a control signal being coupled thereto, said light emitter being characterized by an age value related to the cumulative amount of light that has been generated by said light emitter, said generated light for a given control signal changing with said age value, and a controller that determines said age value of said light emitter and generates said control signal based on a desired light intensity and said determined age value of said light emitter, said controller storing and updating said age value on the basis of said control signal being generated.

2. The light source of claim 1, wherein said light emitter comprises an LED.

3. A light source, comprising:

a plurality of light emitters, each light emitter generating light in response to a control signal being coupled thereto, said each light emitter being characterized by an age value related to the cumulative amount of light that has been generated by said each light emitter, said generated light changing with said age value; and a controller that determines said age value of said each light emitter and generates said control signal based on a desired light intensity for said each light emitter and said determined age value, said controller storing and updating said determined age value for said each light emitter on the basis of said control signal being generated.

4. The light source of claim 3, wherein said controller further comprises a plurality of calibration constants, each calibration constant providing information on the rate at which a corresponding one of said light emitters age, each of said age values being updated by utilizing a corresponding one of said calibration constants.

5. The light source of claim 4, further comprising a photodetector for measuring a light intensity that is generated by each of said light emitters, and wherein said controller utilizes said measured light intensity to alter said calibration constants.

6. A method for operating a light source comprising a light emitter that emits light at an intensity determined by a control signal, said method comprising:

receiving a signal specifying a desired light intensity to be generated by said light emitter;

determining an age value for said light emitter;

determining said control signal based on said desired light intensity and said determined age value, and storing and updating said age value on the basis of said control signal being generated.

7. The method of claim 6, further comprising storing a calibration constant that specifies the rate at which said light emitter ages as a function of the cumulative amount of light generated by said light emitter.

8. The method of claim 7, further comprising:

periodically measuring an intensity of light from said light source when a calibration control signal is applied to said light emitter; and updating said calibration constant in response to said measured intensity.

9. The method of 7, wherein said calibration constant is determined by measuring the rate of aging of said light emitter at the time of manufacture.

* * * * *